US 12,532,238 B2

United States Patent
Leng et al.

(10) Patent No.: US 12,532,238 B2
(45) Date of Patent: Jan. 20, 2026

(54) JOINT OPERATION OF CONDITIONAL HANDOVER AND CONDITIONAL PSCell ADDITION OR CHANGE

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 18/163,793

(22) Filed: Feb. 2, 2023

(65) Prior Publication Data

US 2023/0262554 A1 Aug. 17, 2023

Related U.S. Application Data

(60) Provisional application No. 63/323,363, filed on Mar. 24, 2022, provisional application No. 63/310,818, filed on Feb. 16, 2022.

(51) Int. Cl.
*H04W 36/00* (2009.01)
*H04W 36/08* (2009.01)
*H04W 74/0833* (2024.01)

(52) U.S. Cl.
CPC ....... *H04W 36/08* (2013.01); *H04W 36/0069* (2018.08); *H04W 36/0072* (2013.01); *H04W 74/0833* (2013.01)

(58) Field of Classification Search
CPC ............ H04W 36/08; H04W 36/0069; H04W 36/0072; H04W 74/0833; H04W 455/437
See application file for complete search history.

(56) References Cited

U.S. PATENT DOCUMENTS

2019/0387440 A1\* 12/2019 Yiu .................. H04W 36/0072
2020/0154326 A1   5/2020 Deenoo et al.
(Continued)

FOREIGN PATENT DOCUMENTS

CN        113424576 A  *  9/2021  ............ H04W 76/28
WO     2021009410 A1      1/2021
(Continued)

OTHER PUBLICATIONS

International Search Report and Written Opinion issued May 16, 2023 regarding International Application No. PCT/KR2023/002297, 7 pages.
"5G; NR; Radio Resource Control (RRC); Protocol specification (3GPP TS 38.331 version 16.7.0 Release 16)", ETSI TS 138 331 V16.7.0, Jan. 2022, 950 pages.

*Primary Examiner* — Khai M Nguyen

(57) ABSTRACT

Methods and apparatuses a joint operation of conditional handover and conditional PSCell addition or change in a wireless communication system. A method of a UE comprises: receiving information including association information, execution conditions, and configurations for candidate PCells and candidate PSCells; evaluating the execution conditions for the candidate PCells and associated candidate PSCells simultaneously; upon the execution conditions for (i) a candidate PCell among the candidate PCells and (ii) a candidate PSCell associated with the candidate PCell are satisfied, determining that the candidate PCell and the associated candidate PSCell as a target PCell and an associated target PSCell, respectively; applying the configurations for the target PCell and the associated target PSCell; performing a random access procedure for the target PCell; and performing a random access procedure for the associated target PSCell.

20 Claims, 9 Drawing Sheets

(56) References Cited

U.S. PATENT DOCUMENTS

| | | |
|---|---|---|
| 2021/0235333 A1 | 7/2021 | Saily et al. |
| 2023/0007550 A1* | 1/2023 | Kumar ............ H04W 36/00692 |
| 2024/0073755 A1* | 2/2024 | Yan .................. H04W 36/0069 |
| 2024/0129078 A1* | 4/2024 | Bergqvist ............ H04W 56/001 |

FOREIGN PATENT DOCUMENTS

| | | |
|---|---|---|
| WO | 2021067236 A1 | 4/2021 |
| WO | 2021251625 A1 | 12/2021 |
| WO | 2022028920 A1 | 2/2022 |

OTHER PUBLICATIONS

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

Extended European Search Report issued Apr. 10, 2025 regarding Application No. 23756659.1, 16 pages.

"3rd Generation Partnership Project; Technical Specification Group Radio Access Network; NR; NR and NG-RAN Overall Description; Stage 2 (Release 16)", 3GPP TS 38.300 V16.1.0, Mar. 2020, 133 pages.

\* cited by examiner

JOINT OPERATION OF CONDITIONAL HANDOVER AND CONDITIONAL PSCell ADDITION OR CHANGE

CROSS-REFERENCE TO RELATED APPLICATIONS AND CLAIM OF PRIORITY

The present application claims priority to U.S. Provisional Patent Application No. 63/310,818, filed on Feb. 16, 2022, and U.S. Provisional Patent Application No. 63/323,363, filed on Mar. 24, 2022. The contents of the above-identified patent documents are incorporated herein by reference.

TECHNICAL FIELD

The present disclosure relates generally to wireless communication systems and, more specifically, the present disclosure relates to a joint operation of conditional handover and conditional primary-secondary cell (PSCell) addition or change in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a joint operation of conditional handover and conditional PSCell addition or change in a wireless communication system.

In one embodiment, a user equipment (UE) in a wireless communication system is provided. The UE comprises a transceiver configured to receive information including association information, execution conditions, and configurations for candidate primary cells (PCells) and candidate PSCells. The UE further comprises a processor operably coupled to the transceiver, the processor configured to: evaluate the execution conditions for the candidate PCells and associated candidate PSCells simultaneously; upon the execution conditions for (i) a candidate PCell among the candidate PCells and (ii) a candidate PSCell associated with the candidate PCell are satisfied, determine that the candidate PCell and the associated candidate PSCell as a target PCell and an associated target PSCell, respectively; apply the configurations for the target PCell and the associated target PSCell; perform a random access procedure for the target PCell; and perform a random access procedure for the associated target PSCell.

In another embodiment, a method of UE in a wireless communication system is provided. The method comprises: receiving information including association information, execution conditions, and configurations for candidate PCells and candidate PSCells; evaluating the execution conditions for the candidate PCells and associated candidate PSCells simultaneously; upon the execution conditions for (i) a candidate PCell among the candidate PCells and (ii) a candidate PSCell associated with the candidate PCell are satisfied, determining that the candidate PCell and the associated candidate PSCell as a target PCell and an associated target PSCell, respectively; applying the configurations for the target PCell and the associated target PSCell; performing a random access procedure for the target PCell; and performing a random access procedure for the associated target PSCell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
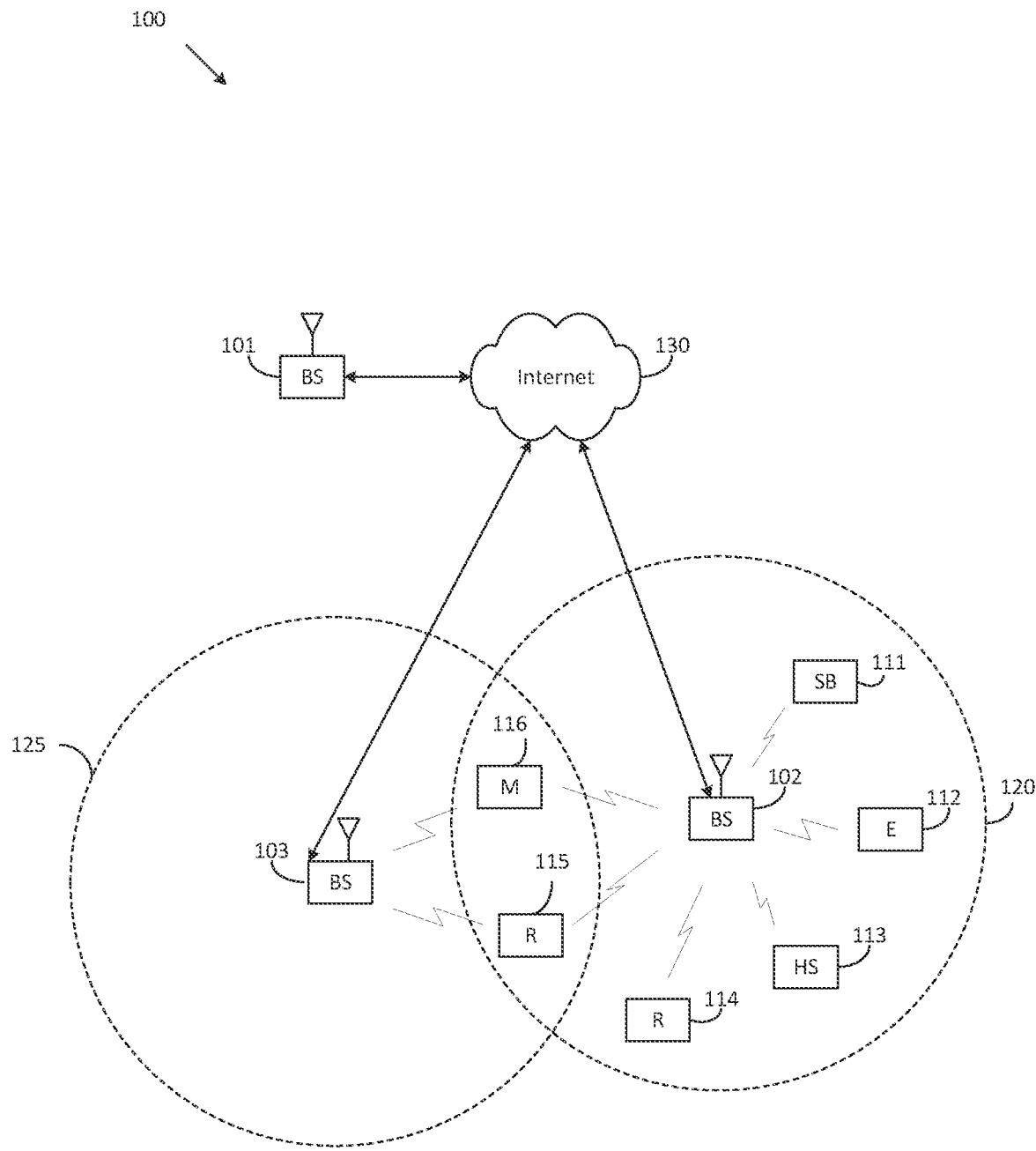
FIG. 1 illustrates an example of wireless network according to embodiments of the present disclosure.
Figure 2:
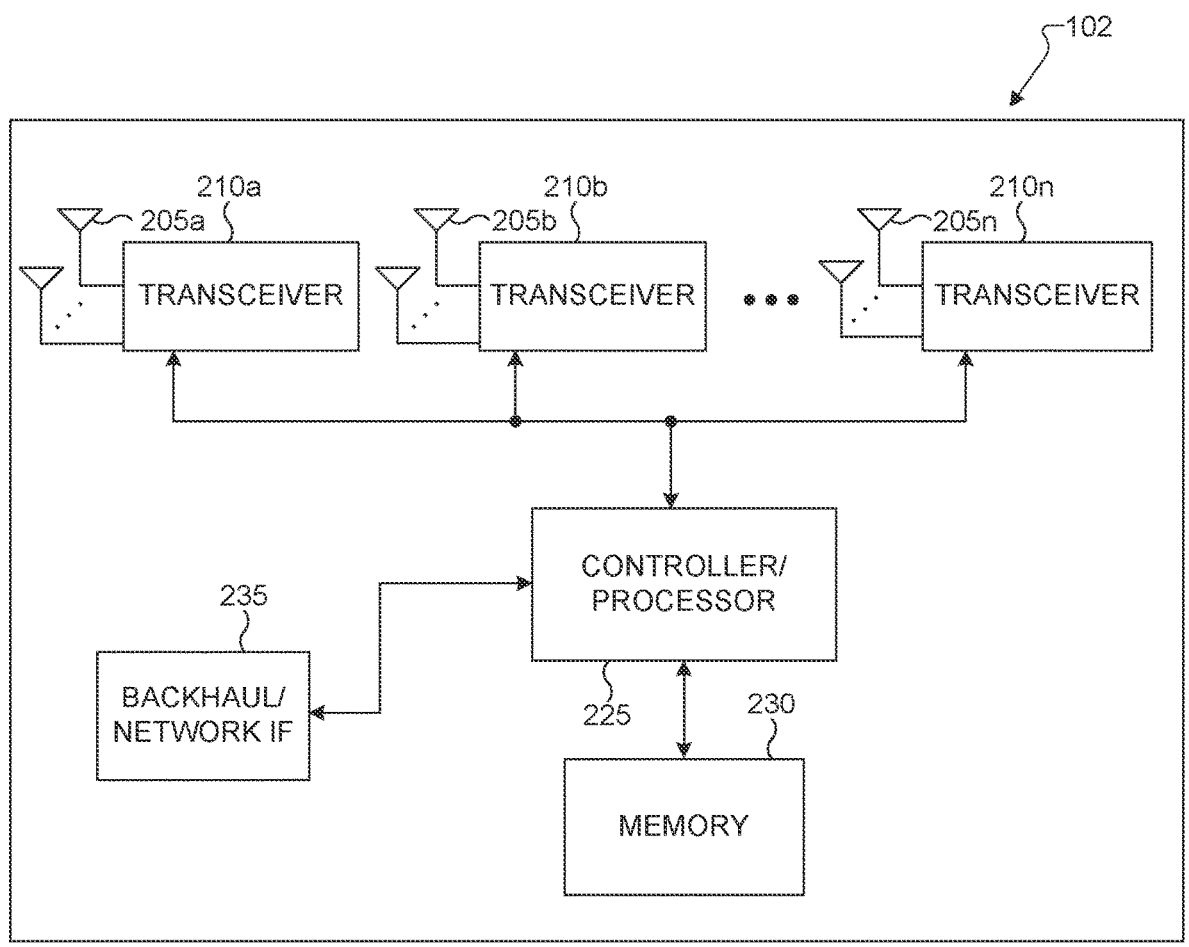
FIG. 2 illustrates an example of gNB according to embodiments of the present disclosure.
Figure 3:
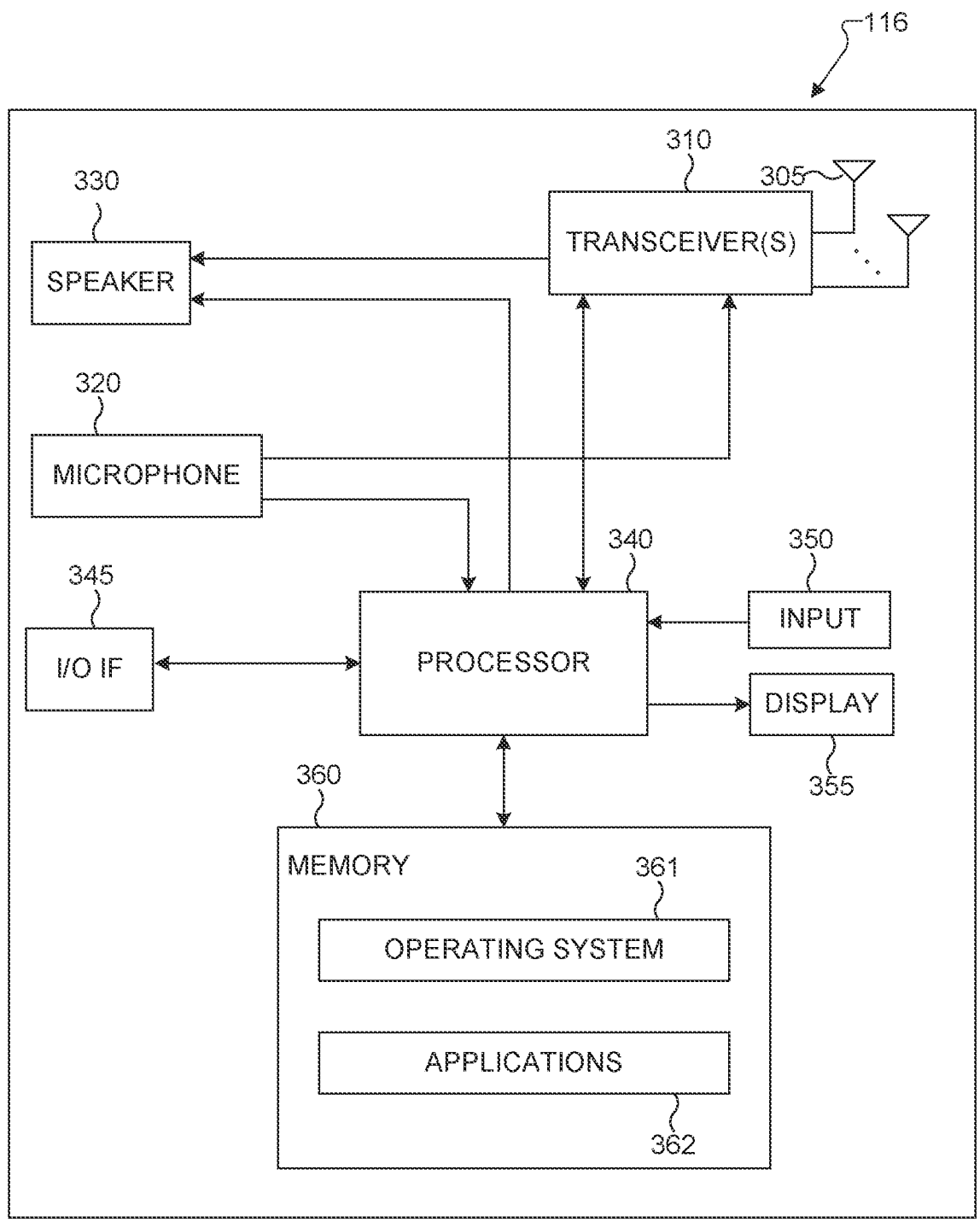
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal,"

"wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for a joint operation of conditional handover and conditional PSCell addition or change in a wireless communication system. In certain embodiments, and one or more of the gNBs 101-103 includes circuitry, programing, or a combination thereof, for a joint operation of conditional handover and conditional PSCell addition or change in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for joint operation of conditional handover and conditional PSCell addition or change in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a joint operation of conditional handover and conditional PSCell addition or change in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
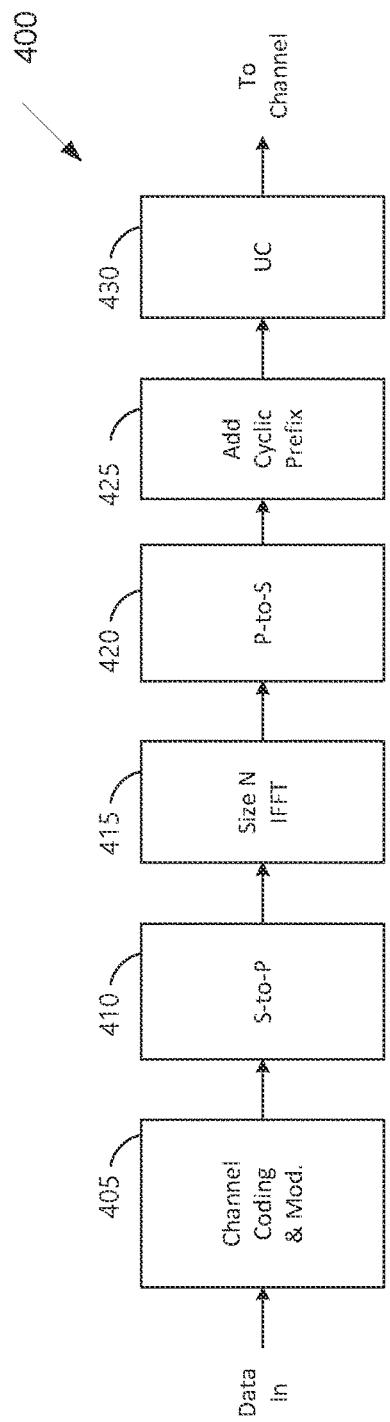
FIGS. 4 and 5 illustrate example of wireless transmit and receive paths according to this disclosure.
Figure 5:
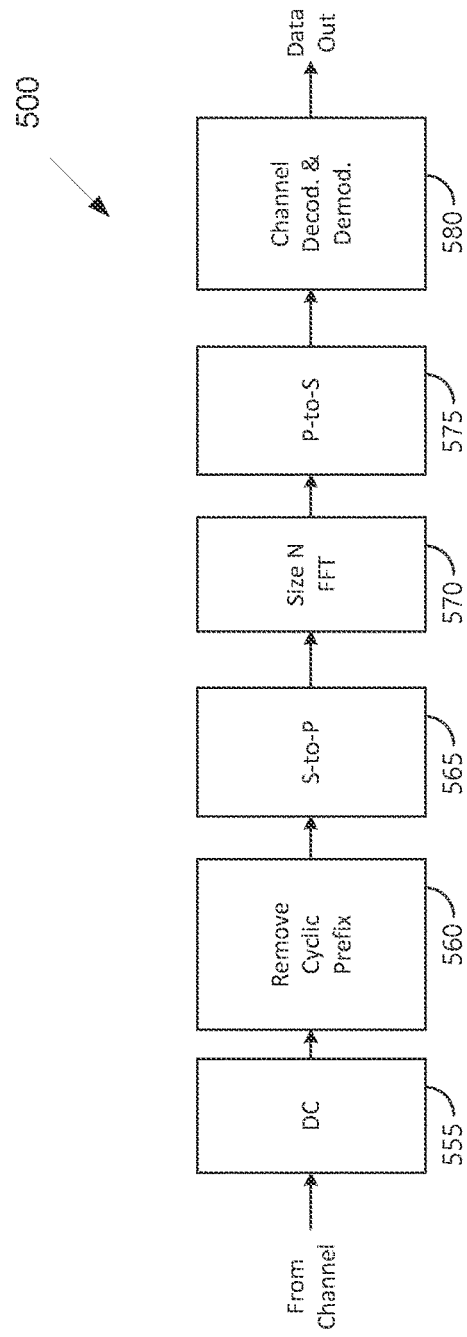

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G NR. Mobility handling is a critical aspect in any mobile communication system including 5G system. For a UE in a connected mode, mobility is controlled by the network with the assistance from the UE to maintain a good quality of connection. Based on the measurement on radio link quality of the serving cell and neighboring cell(s) reported by the UE, the network may hand over the UE to a neighboring cell that can provide better radio conditions when the UE is experiencing a degraded connection to the serving cell.

In release-15 NR, the basic mechanism and procedure of network-controlled mobility in connected mode is developed. In release-16 NR, enhancements to network-controlled mobility in connected mode are introduced to mitigate connection interruption during handover procedure, among which is the conditional handover (CHO). In a CHO procedure, upon receiving CHO configuration in a radio resource control (RRC) reconfiguration message which contains configuration for multiple candidate cells, a UE starts evaluating the CHO execution conditions for the candidate cell(s). If at least one CHO candidate cell satisfies the corresponding CHO execution condition, the UE detaches from the source cell, applies configuration and synchronizes to the target cell and completes the CHO procedure by sending RRC reconfiguration complete message to the target gNB. The UE releases stored CHO configurations after successful completion of handover procedure.

To improve system performance and tightly link to LTE networks, another useful feature supported in 5G networks is dual connectivity (DC). In a DC operation, a multiple Rx/Tx capable UE can be configured to communicate with two different nodes, known as a master node (MN) serving a master cell group (MCG) and a secondary node (SN) serving a secondary cell group (SCG). The MN and the SN are connected via non-ideal backhaul, where one node provides NR access and the other one provides either E-UTRA or NR access. The UE connects to a primary cell (PCell) from the MCG and connects to a primary SCG cell (PSCell) from the SCG.

The UE establishes connection to a SN by SN addition/change procedure or conditional PSCell addition/change (CPAC) procedure where the CHO principle is applied to hand over the UE from the serving PSCell to a target PSCell intra-SN or inter-SN. Similarly, the UE may release CPAC configuration upon successful CPAC execution, i.e., after UE completes the random access procedure to the target PSCell and has sent RRC reconfiguration complete message to the MN. However, when successive CPC is needed for UE moving fast, MN/SN may reinitiate the procedure via inter-node message exchange and reconfigure CPC by sending RRC reconfiguration message to the UE. This slows down successive PSCell change and causes connection interruption to the SN(s).

To reduce interruption in PCell handover and enable fast SN change at the same time, a joint operation of CHO and CPAC is of interest. The preparation, the configuration, and the UE behavior for the joint operation need to be specified.

In the present disclosure, for the joint operation of CHO and CPAC, the signaling flow and UE behavior are specified. Variations of operation procedures, including preparation, evaluation, and execution, are provided. Specifically, serial, parallel, and independent evaluation and/or execution of CHO and CPAC are considered.

The preparation for the joint operation of CHO and CPAC involves inter-node RRC message exchanges among source MN, source SN, target MN(s) and target SN(s) to prepare the CHO and CPAC configuration to be sent to the UE. One embodiment of inter-node RRC message flow is illustrated in FIG. 6.

Figure 6:
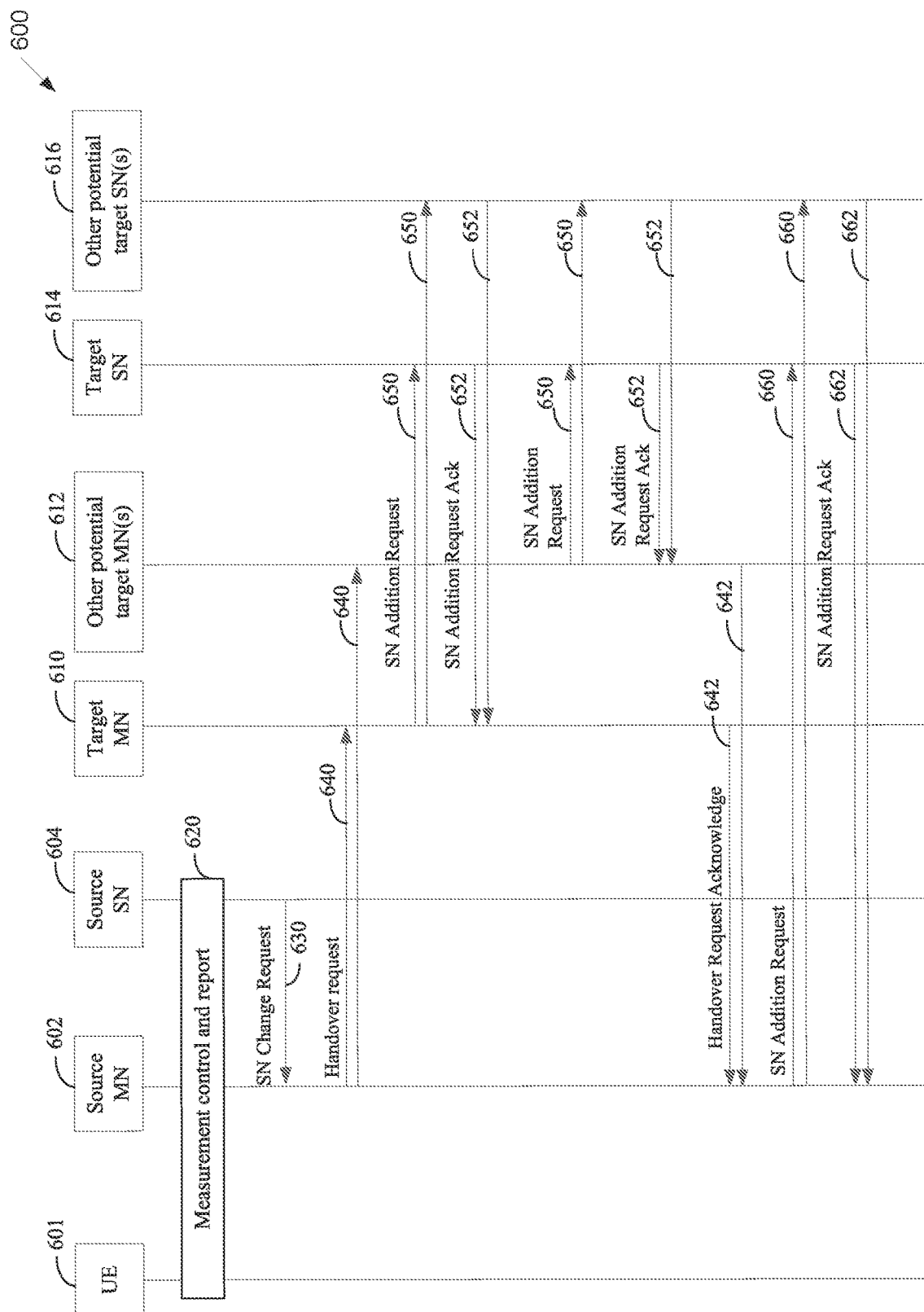
FIG. 6 illustrates a signaling flow for a joint operation of CHO and CPAC according to embodiments of the present disclosure.

FIG. 6 illustrates a signaling flow 600 for a joint operation of CHO and CPAC according to embodiments of the present disclosure. The signaling flow 600 as may be performed by a UE (e.g., 111-116 as illustrated in FIG. 1) and a BS (e.g., 101-103 as illustrated in FIG. 1). An embodiment of the signaling flow 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

For 620, the UE 601 performs measurement and reports according to the measurement configuration provided by the source MN 602 and/or the source SN 604 for MN and/or SN change.

For 630, the source SN can initiate the CPC by sending a SN change request including e.g., the provided candidate PSCells and/or the associated CPC execution conditions and/or the associated SCG configuration.

For 640, the source MN 602 initiates the joint CHO and CPAC procedure by sending the handover request to target MN candidates 610/612. The message can include MCG configuration and/or SCG configuration, e.g., the source SN ID and the UE context in the source SN.

For 642, the target MN 610/612 sends the handover request acknowledge to the source MN including a transparent RRC container containing the PCell and the corresponding MCG configuration to be sent to the UE as an RRC message to perform the CHO.

If to prepare CPAC with target-MN involvement, the source MN can include recommended candidate PSCells in the handover request (640) based on the measurement results. The target MN 610/612 can choose a list of PSCells for CPAC taking into account the recommended candidate PSCells provided by the source MN. For 650, each target MN 610/612 sends the SN addition request message to target SNs 614/616 to ask resource allocation for the UE, including the list of PSCells to suggest.

Each target SN 614/616 can decide the list of PSCells to prepare, i.e., accept or reject each of the candidate PSCells suggested by the source MN and the target MN. For each prepared PSCell, the target SN decides other SCG SCells and provides the corresponding SCG configuration to the target MN in the SN addition request acknowledge (652). The target SN can include the indication of the full or delta configuration. The SCG configuration provided by the target SN is forwarded to the source MN in the handover request acknowledge (642) to be sent to the UE to perform the CPAC.

Alternatively, if to prepare CPAC without target-MN involvement, the source MN can directly send the SN addition request (660) to a target SN 614/616 to request resource allocation for the UE, including candidate PSCells recommended based on the measurement results. Within the list of PSCells indicated by the source MN, the target SN decides the list of PSCell(s) to prepare, i.e., accept or reject each of the candidate PSCells suggested by the source MN. For each prepared PSCell, the target SN decides other SCG SCells and provides the corresponding SCG configuration to the source MN in the SN addition request acknowledge (662). The target SN can include the indication of the full or delta configuration.

To configure the joint operation of CHO and CPAC, the source MN sends an RRC reconfiguration message to the UE including the CHO execution conditions, the CPAC execution conditions, the MCG/SCG configuration associated to each candidate PCell/PSCell.

The CHO execution condition and the MCG configuration associated to each candidate PCell can be configured as legacy CHO configuration, where the MCG configuration is contained in the encapsulated RRCReconfiguration message from the target MN.

The CHO configuration and CPA/CPC configuration can be jointly or independently configured. For example, the candidate PSCell(s) can be configured to be associated with a candidate PCell or to be not associated with any candidate PCell. The CPAC execution condition and the SCG configuration associated with each candidate PSCell can be indicated to be jointly applied with the CHO configuration. An example is shown in TABLE 1, where the configuration ID for a candidate PSCell is associated with the CHO configuration for a candidate PCell.

TABLE 1

Joint configuration of CHO and CPAC with a mapping indication

```
RRCReconfiguration-IEs ::= SEQUENCE {
    ...,
    conditionalReconfiguration-r16 ConditionalReconfiguration-r16 OPTIONAL, -- Need M
}
ConditionalReconfiguration-r16 ::= SEQUENCE {
attemptCondReconfig-r16 ENUMERATED {true} OPTIONAL, -- Cond CHO
condReconfigToRemoveList-r16 CondReconfigToRemoveList-r16 OPTIONAL, -- Need N
condReconfigToAddModList-r16 CondReconfigToAddModList-r16 OPTIONAL, -- Need N
...
}
CondReconfigToRemoveList-r16 ::= SEQUENCE (SIZE (1.. maxNrofCondCells-r16)) OF
CondReconfigId-r16
CondReconfigToAddModList-r16 ::= SEQUENCE (SIZE (1.. maxNrofCondCells-r16)) OF
CondReconfigToAddMod-r16
CondReconfigToAddMod-r16 ::= SEQUENCE {
condReconfigId-r16 CondReconfigId-r16,
condExecutionCond-r16 SEQUENCE (SIZE (1..2)) OF MeasId OPTIONAL, -- Cond
condReconfigAdd
    condRRCReconfig-r16 OCTET STRING (CONTAINING RRCReconfiguration)
OPTIONAL, -- Cond condReconfigAdd
    ...,
    [[
    associatedCHOcandiate CondReconfigId
OPTIONAL, -- Cond condReconfigAdd
    ]]
}
```

In another example, each encapsulated RRCReconfiguration message from the potential target MN for CHO configuration can contain an encapsulated RRCReconfiguration message from the potential target SN including the associated CPAC configuration to be applied jointly with the CHO, as shown in TABLE 2.

Alternatively, a new RRC IE, e.g., conditionalReconfigurationSN, can be introduced to jointly configure the CHO and the associated CPAC, which includes the CPAC execution conditions and the SCG configuration associated to each candidate PSCell, as shown in TABLE 3. The RRC IE can be included in the CHO configuration IE of one candidate

TABLE 2

Joint configuration of CHO and CPAC using encapsulated RRCReconfiguration

```
RRCReconfiguration-IEs ::= SEQUENCE {
  ...,
  conditionalReconfiguration-r16 ConditionalReconfiguration-r16 OPTIONAL, -- Need M
}
ConditionalReconfiguration-r16 ::= SEQUENCE {
attemptCondReconfig-r16 ENUMERATED {true} OPTIONAL, -- Cond CHO
condReconfigToRemoveList-r16 CondReconfigToRemoveList-r16 OPTIONAL, -- Need N
condReconfigToAddModList-r16 CondReconfigToAddModList-r16 OPTIONAL, -- Need N
...
}
CondReconfigToRemoveList-r16 ::= SEQUENCE (SIZE (1.. maxNrofCondCells-r16)) OF
CondReconfigId-r16
CondReconfigToAddModList-r16 ::= SEQUENCE (SIZE (1.. maxNrofCondCells-r16)) OF
CondReconfigToAddMod-r16
CondReconfigToAddMod-r16 ::= SEQUENCE {
condReconfigId-r16 CondReconfigId-r16,
condExecutionCond-r16 SEQUENCE (SIZE (1..2)) OF MeasId OPTIONAL, -- Cond
condReconfigAdd
    condRRCReconfig-r16 OCTET STRING (CONTAINING RRCReconfiguration)
OPTIONAL, -- Cond condReconfigAdd
  ...
}
RRCReconfiguration-v1560-IEs ::= SEQUENCE {
mrdc-SecondaryCellGroupConfig SetupRelease { MRDC-SecondaryCellGroupConfig }
OPTIONAL, -- Need M
...
}
MRDC-SecondaryCellGroupConfig ::= SEQUENCE {
mrdc-ReleaseAndAdd ENUMERATED {true} OPTIONAL, -- Need N
mrdc-SecondaryCellGroup CHOICE {
nr-SCG OCTET STRING (CONTAINING RRCReconfiguration),
eutra-SCG OCTET STRING
}
}
RRCReconfiguration-IEs ::= SEQUENCE {
   secondaryCellGroup OCTET STRING (CONTAINING CellGroupConfig) OPTIONAL,
-- Cond SCG
   measConfig MeasConfig OPTIONAL, -- Need M
   otherConfig OtherConfig OPTIONAL, -- Need M
   conditionalReconfiguration-r16 ConditionalReconfiguration-r16 OPTIONAL, -- Need M
}
ConditionalReconfiguration-r16 ::= SEQUENCE {
attemptCondReconfig-r16 ENUMERATED {true} OPTIONAL, -- Cond CHO
condReconfigToRemoveList-r16 CondReconfigToRemoveList-r16 OPTIONAL, -- Need N
condReconfigToAddModList-r16 CondReconfigToAddModList-r16 OPTIONAL, -- Need N
...
}
CondReconfigToRemoveList-r16 ::= SEQUENCE (SIZE (1.. maxNrofCondCells-r16)) OF
CondReconfigId-r16
CondReconfigToAddModList-r16 ::= SEQUENCE (SIZE (1.. maxNrofCondCells-r16)) OF
CondReconfigToAddMod-r16
CondReconfigToAddMod-r16 ::= SEQUENCE {
condReconfigId-r16 CondReconfigId-r16,
condExecutionCond-r16 SEQUENCE (SIZE (1..2)) OF MeasId OPTIONAL, -- Cond
condReconfigAdd
condRRCReconfig-r16 OCTET STRING (CONTAINING RRCReconfiguration)
OPTIONAL, -- Cond condReconfigAdd
...
}
```

PCell. The RRC IE can include a list of CPA/CPC configurations, where each entry of the list is for one candidate PSCell associated with the candidate PCell and can include at least one of the CPA/CPC execution condition, the candidate PSCell and the corresponding SCG configuration.

TABLE 3

Joint configuration of CHO and CPAC using a new RRC IE

RRCReconfiguration-IEs ::= SEQUENCE {
...,
  conditionalReconfiguration-r16 ConditionalReconfiguration-r16 OPTIONAL, -- Need M
}
ConditionalReconfiguration-r16 ::= SEQUENCE {
attemptCondReconfig-r16 ENUMERATED {true} OPTIONAL, -- Cond CHO
condReconfigToRemoveList-r16 CondReconfigToRemoveList-r16 OPTIONAL, -- Need N
condReconfigToAddModList-r16 CondReconfigToAddModList-r16 OPTIONAL, -- Need N
  ...,
  [[
  conditionalReconfigurationSN ConditionalReconfigurationSN OPTIONAL, -- Need N
  ]]
}
ConditionalReconfigurationSN ::= SEQUENCE {
condReconfigToRemoveList CondReconfigToRemoveList OPTIONAL, -- Need N
condReconfigToAddModList CondReconfigToAddModList OPTIONAL, -- Need N
  ...,
}
CondReconfigToRemoveList ::= SEQUENCE (SIZE (1.. maxNrofCondCells)) OF CondReconfigId
CondReconfigToAddModList ::= SEQUENCE (SIZE (1.. maxNrofCondCells)) OF CondReconfigToAddMod
CondReconfigToAddMod ::= SEQUENCE {
condReconfigId CondReconfigId,
condExecutionCond SEQUENCE (SIZE (1..2)) OF MeasId OPTIONAL, -- Cond condReconfigAdd
  condRRCReconfig OCTET STRING (CONTAINING RRCReconfiguration) OPTIONAL,
-- Cond condReconfigAdd
  ...
}

In one embodiment, when the UE is configured to release the configuration of a CHO candidate cell, the configuration of the associated CPA/CPC candidate cells can be released jointly.

For each candidate PCell for CHO and each candidate PSCell for CPAC, at least one and at most 2 measId(s) can be indicated in the condExecutionCond associated to a condReconfigId. The measId points to an CHO/CPAC event in condTriggerConfig. An CHO/CPAC event can be configured as one of CondEvent A3 (i.e., conditional reconfiguration candidate becomes amount of offset better than PCell/PSCell), CondEvent A4 (i.e., conditional reconfiguration candidate becomes better than absolute threshold), and CondEvent A5 (i.e., PCell/PSCell becomes worse than absolute threshold1 AND conditional reconfiguration candidate becomes better than another absolute threshold2).

Figure 7:
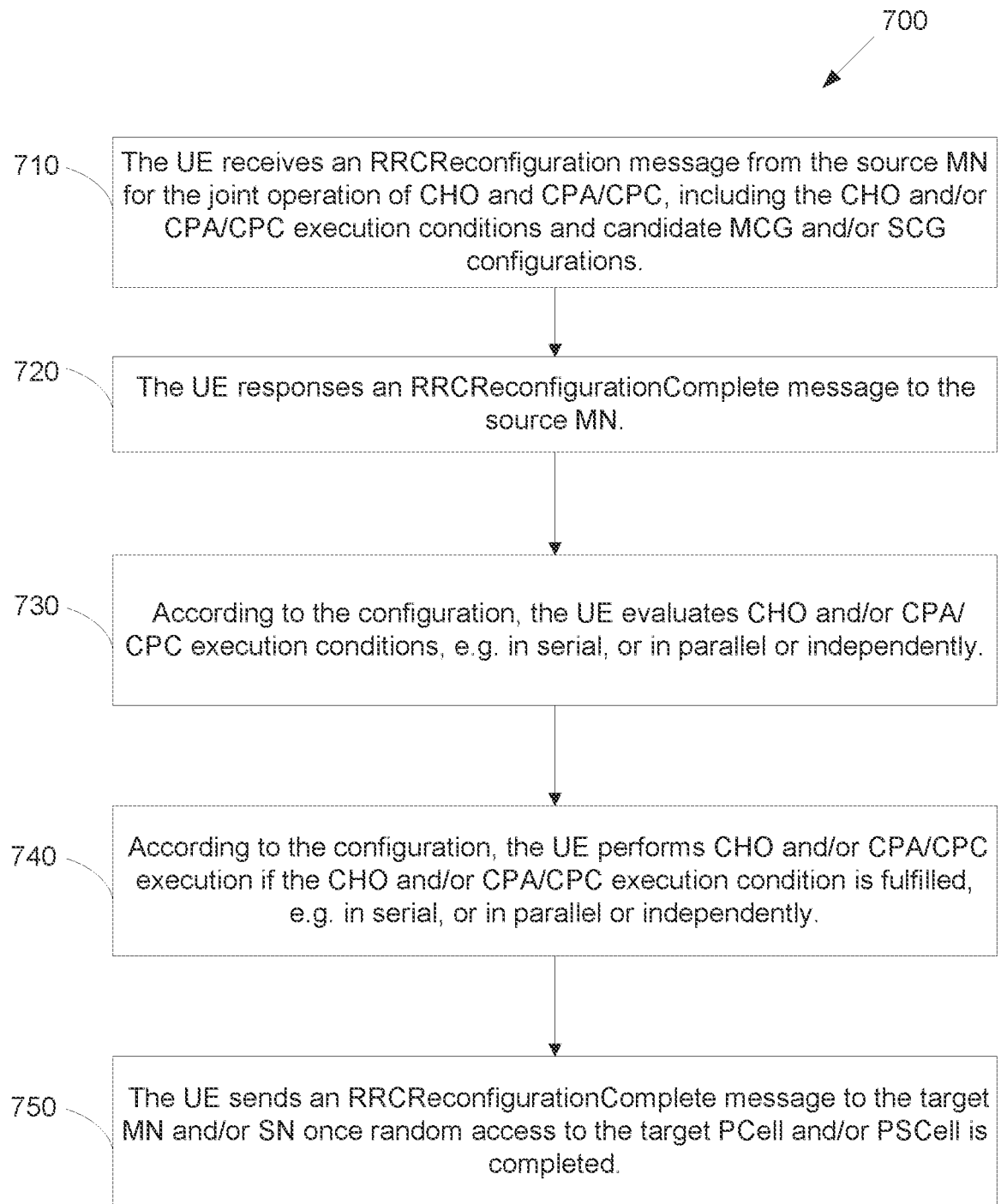
FIG. 7 illustrates a flowchart of a method for a UE behavior for joint operation of CHO and CPA/CPC according to embodiments of the present disclosure.

FIG. 7 illustrates a flowchart of a method 700 for a UE behavior for joint operation of CHO and CPA/CPC according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

Once the RRCReconfiguration message including the configuration for the joint operation of CHO and CPAC is received (e.g., 710 as illustrated in FIG. 7), the UE stores the CHO and CPAC configuration, replies to the source MN with an RRCReconfigurationComplete message (720), and evaluates the execution condition of the joint CHO and CPAC for different operation modes, e.g., in serial, or in parallel, or independent (730, 740).

The operation mode of the joint CHO and CPAC, for example, Serial mode, Parallel mode, and Independent mode, can be configured by the source MN or predefined. The UE accordingly evaluates the execution condition of CHO and the execution condition of CPAC in serial, in parallel, or independently (730). The UE performs CHO and/or CPA/CPC execution if the CHO and/or CPA/CPC execution condition is fulfilled, e.g., in serial, or in parallel or independently (740). Once the random access to the target PCell and/or to the target PSCell is completed, the UE sends an RRCReconfiguration message to the target MN and/or the target SN (750).

Figure 8:
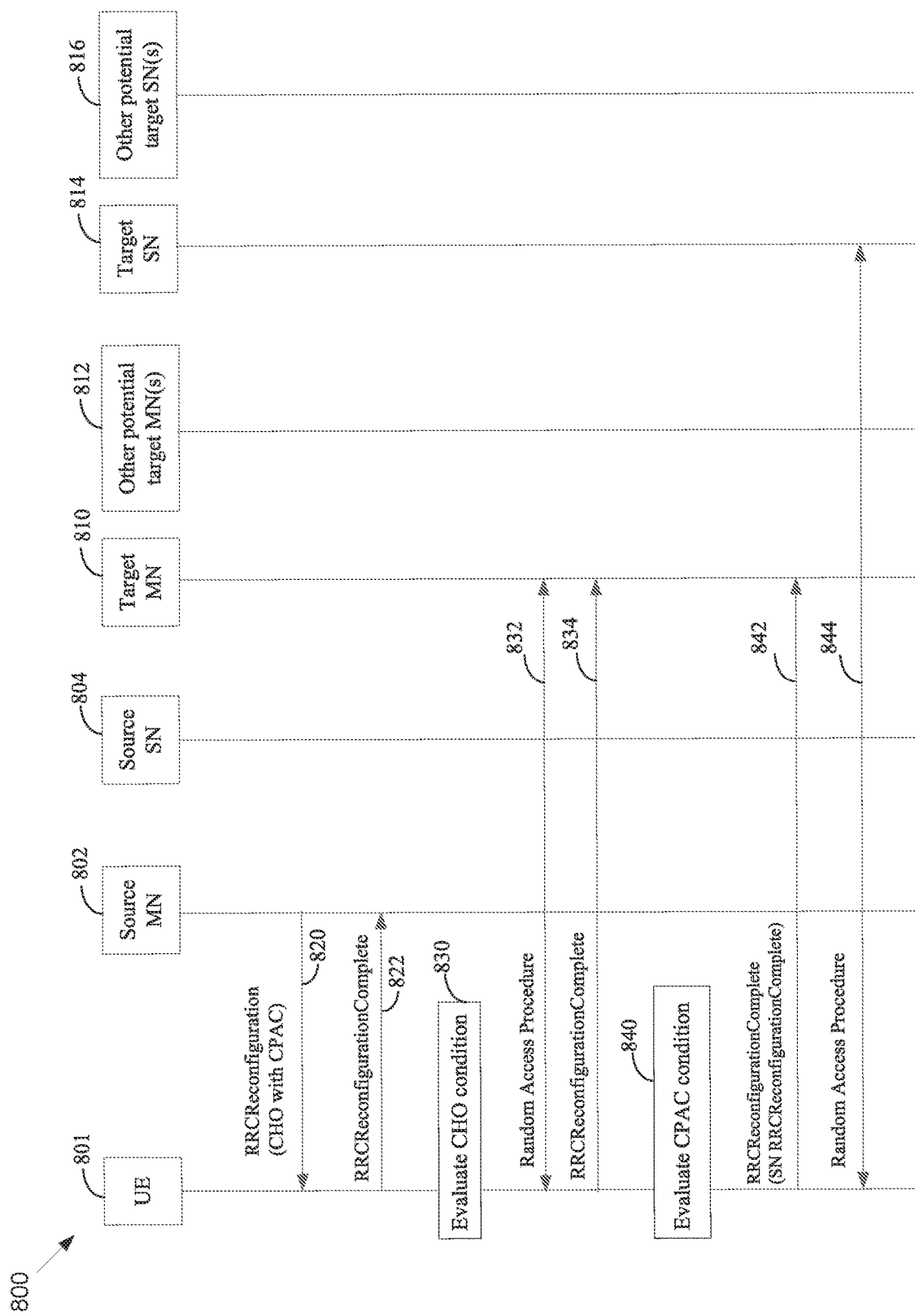
FIG. 8 illustrates a signaling flow for a joint operation of CHO and CPAC in a serial mode according to embodiments of the present disclosure.

FIG. 8 illustrates a signaling flow 800 for a joint operation of CHO and CPAC in a serial mode according to embodiments of the present disclosure. The signaling flow 800 as may be performed by a UE (e.g., 111-116 as illustrated in FIG. 1) and a BS (e.g., 101-103 as illustrated in FIG. 1). An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

Specifically, when the serial mode is configured or predefined, as shown in FIG. 8, the UE first evaluates the execution condition of CHO (830). If the execution condition of one candidate PCell is satisfied, i.e., the event(s) associated to all measId(s) within condTriggerConfig for a candidate PCell is fulfilled, the candidate PCell is considered as a triggered cell. If more than one triggered cells exist, the UE selects one of the triggered cells as the selected cell for conditional reconfiguration execution. The selection can be up to the UE implementation. For the selected cell of CHO, the UE applies the stored condRRCReconfig (i.e., the encapsulated RRCReconfiguration) of the selected cell, detaches from the source PCell, performs random access procedure to the target PCell (i.e., the selected cell) (832), and completes the handover by sending an RRCReconfigurationComplete message to the target MN (834).

The UE can retain or release (e.g., according to configuration) stored CHO configurations after successful completion of handover, but retain the associated CPAC configuration. Once the UE successfully attaches to the target PCell, the UE continues to evaluate the execution condition of CPAC (840). If the execution condition of one candidate PSCell is satisfied, i.e., the event(s) associated to all measId(s) within condTriggerConfig for a candidate PSCell is fulfilled, the UE applies the RRCReconfiguration corresponding to the selected candidate PSCell (i.e., target PSCell), and sends an RRCReconfigurationComplete message to the current MN, including an RRCReconfigurationComplete message for the target SN (842). If configured with bearers requiring SCG radio resources, the UE performs random access to the target SN (844).

Figure 9:
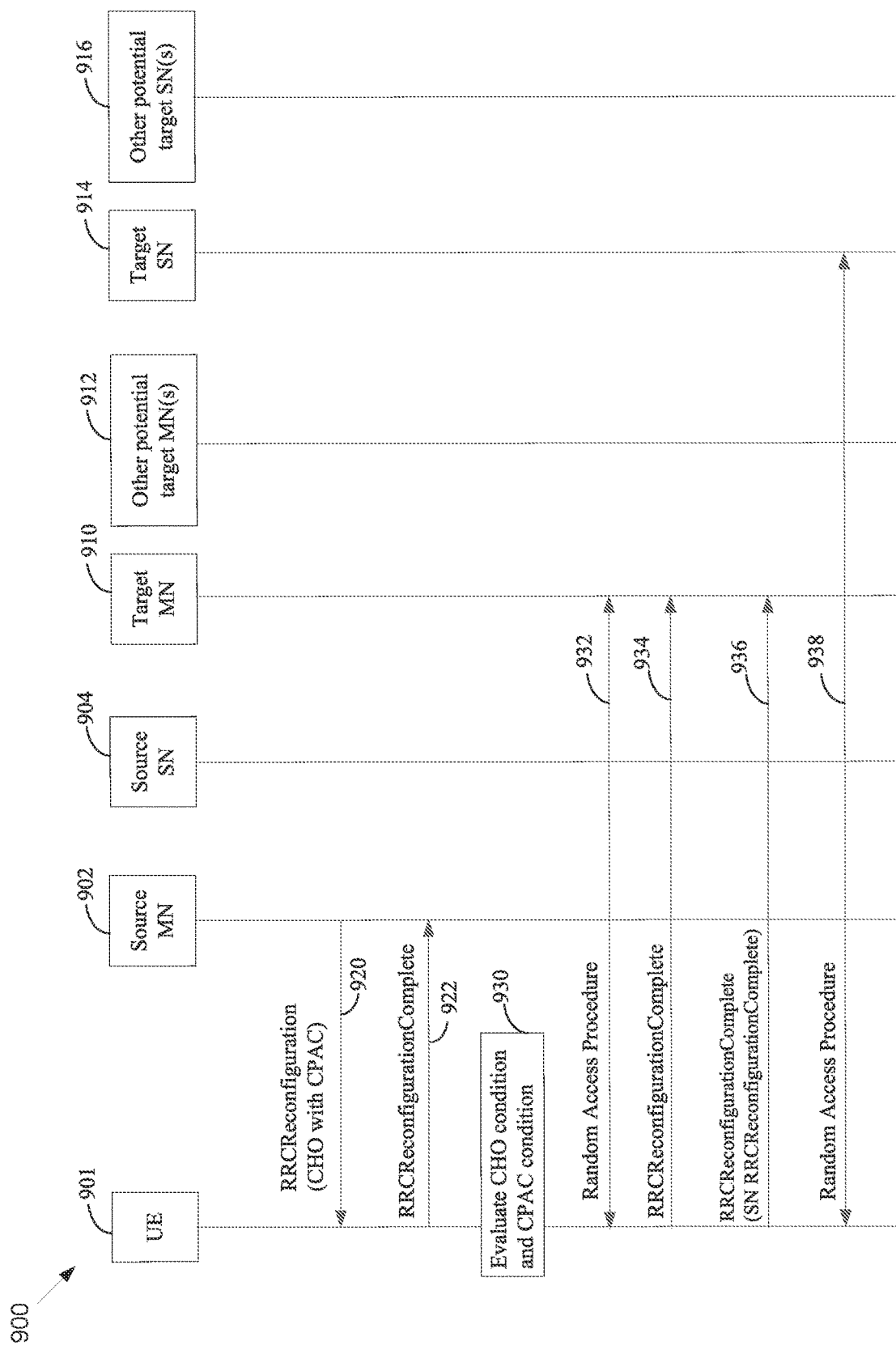
FIG. 9 illustrates a signaling flow for a joint operation of CHO and CPAC in a parallel mode according to embodiments of the present disclosure.

FIG. 9 illustrates a signaling flow 900 for a joint operation of CHO and CPAC in a parallel mode according to embodiments of the present disclosure. The signaling flow 900 as may be performed by a UE (e.g., 111-116 as illustrated in FIG. 1) and a BS (e.g., 101-103 as illustrated in FIG. 1). An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

When the parallel mode is configured or predefined, as shown in FIG. 9, the UE evaluates the execution conditions of CHO and CPAC simultaneously (930). The execution conditions of CHO and CPAC are considered to be satisfied at the same time if the execution condition of one candidate PCell and the execution condition of one candidate PSCell are satisfied at the same time or one after another within a certain time interval, where the time interval can be the length of a configured timer timeToCount.

For example, the UE starts or restarts a timeToCount timer when the event(s) associated to all measId(s) within condTriggerConfig for a candidate PCell (or PSCell) is fulfilled. When the timeToCount timer for the candidate PCell (or PSCell) is running, if the event(s) associated to all measId(s) within condTriggerConfig for any candidate PSCell (or PCell) is fulfilled before the timer expiry, the execution condition of joint CHO and CPAC is considered to be satisfied in the parallel mode, and the pair of the PCell and the PSCell is considered as a triggered cell pair. If more than one triggered cell pairs exist, select one of the triggered cell pairs that can be up to the UE implementation. For the selected cell pair (i.e., the target PCell and the target PSCell), the UE first applies the stored condRRCReconfig (i.e., the encapsulated RRCReconfiguration) of the selected PCell, detaches from the source PCell, performs random access procedure to the target PCell (932), and completes the handover by sending an RRCReconfigurationComplete message to the target MN (934).

The UE can retain or release (e.g., according to configuration) stored CHO configurations after successful completion of handover, but retains the RRCReconfiguration corresponding to the selected PSCell. Once the UE successfully attaches to the target PCell, the UE applies the RRCReconfiguration corresponding to the selected PSCell (i.e., the target PSCell), and sends an RRCReconfigurationComplete message to the current MN (936), including an RRCReconfigurationComplete message for the target SN. If configured with bearers requiring SCG radio resources, the UE performs random access to the target SN (938).

When the independent mode is configured or predefined, the UE evaluates the execution condition of CHO and the execution condition of CPAC independently. The UE follows the CHO and CPAC coexistence principle.

For example, the following rules can be predefined and/or configured for UE behavior.

In one example, the UE does not keep evaluating CPAC execution conditions when CHO is triggered and/or failed.

In one example, the UE can keep evaluating CHO execution conditions when CPAC is triggered and/or failed.

In one example, when a CHO is triggered while a CPAC is being executed, the UE can perform the CPAC first and then performs the CHO; alternatively, the UE can stop the CPAC execution and falls back to the source SCG configuration, and/or suspend to execution CPAC until CHO is completed.

In one example, a UE can suspend to trigger and/or execute CPAC while a CHO is being executed.

In one example, when the CHO and CPAC execution conditions are fulfilled at the same time, the UE can perform CHO in priority.

In one example, CHO configurations can be kept when CPAC is completed, while CPAC configuration can be released or maintained when CHO is completed.

In another embodiment, the UE evaluates the execution conditions for candidate PCells and the execution conditions for the candidate PSCells associated with each candidate PCell simultaneously. Upon the execution condition of one candidate PCell is fulfilled, regardless the fulfillment of the execution conditions for the associated PSCells, the UE selects the candidate PCell with execution condition fulfilled as the target PCell, applies the configuration of the target PCell and the corresponding MCG, and executes CHO by performing random access procedure to the target PCell.

Upon the successful completion of the random access to the target PCell, the UE retrieves the CPA/CPC configuration of candidate PSCells associated with the target PCell, and evaluates the CPA/CPC execution condition for each candidate PSCell. Upon the execution condition for one candidate PSCell is fulfilled, the UE selects that PSCell as the target PSCell, sends CPA/CPC completion confirmation to the current PCell, applies the configuration of the target PSCell and the corresponding SCG, and performs random access to the target PSCell if configured with bearers requiring SCG radio resources.

In yet another embodiment, the UE evaluates the execution conditions for candidate PCells and the execution conditions for the candidate PSCells associated with each candidate PCell simultaneously. Upon the execution condition of one candidate PCell is fulfilled, the UE selects that candidate PCell with execution condition fulfilled as the target PCell, and starts a timer with a configured duration. If the execution conditions for one associated PSCell is fulfilled when the timer is running, the UE stops the timer, selects that candidate PSCell with execution condition fulfilled as the target PSCell. The UE applies the configuration of the target PCell and the corresponding MCG, and executes CHO by performing random access procedure to the target PCell. Upon the successful completion of the random access to the target PCell, the UE retrieves and applies the configuration of the target PSCell and the corresponding SCG, sends CPA/CPC completion confirmation to the current PCell, and performs random access to the target PSCell if configured with bearers requiring SCG radio resources.

While, if none of the execution conditions for the associated candidate PSCells is fulfilled before the timer expires, the UE applies the configuration of the target PCell and the corresponding MCG, and executes CHO by performing random access procedure to the target PCell. Upon the successful completion of the random access to the target PCell, the UE retrieves the CPA/CPC configuration of candidate PSCells associated with the target PCell, and continues to evaluate the CPA/CPC execution condition for each candidate PSCell. Upon the execution condition for one candidate PSCell is fulfilled, the UE selects that PSCell as the target PSCell, sends CPA/CPC completion confirmation to the current PCell, applies the configuration of the target PSCell and the corresponding SCG, and performs random access to the target PSCell if configured with bearers requiring SCG radio resources.

Figure 10:
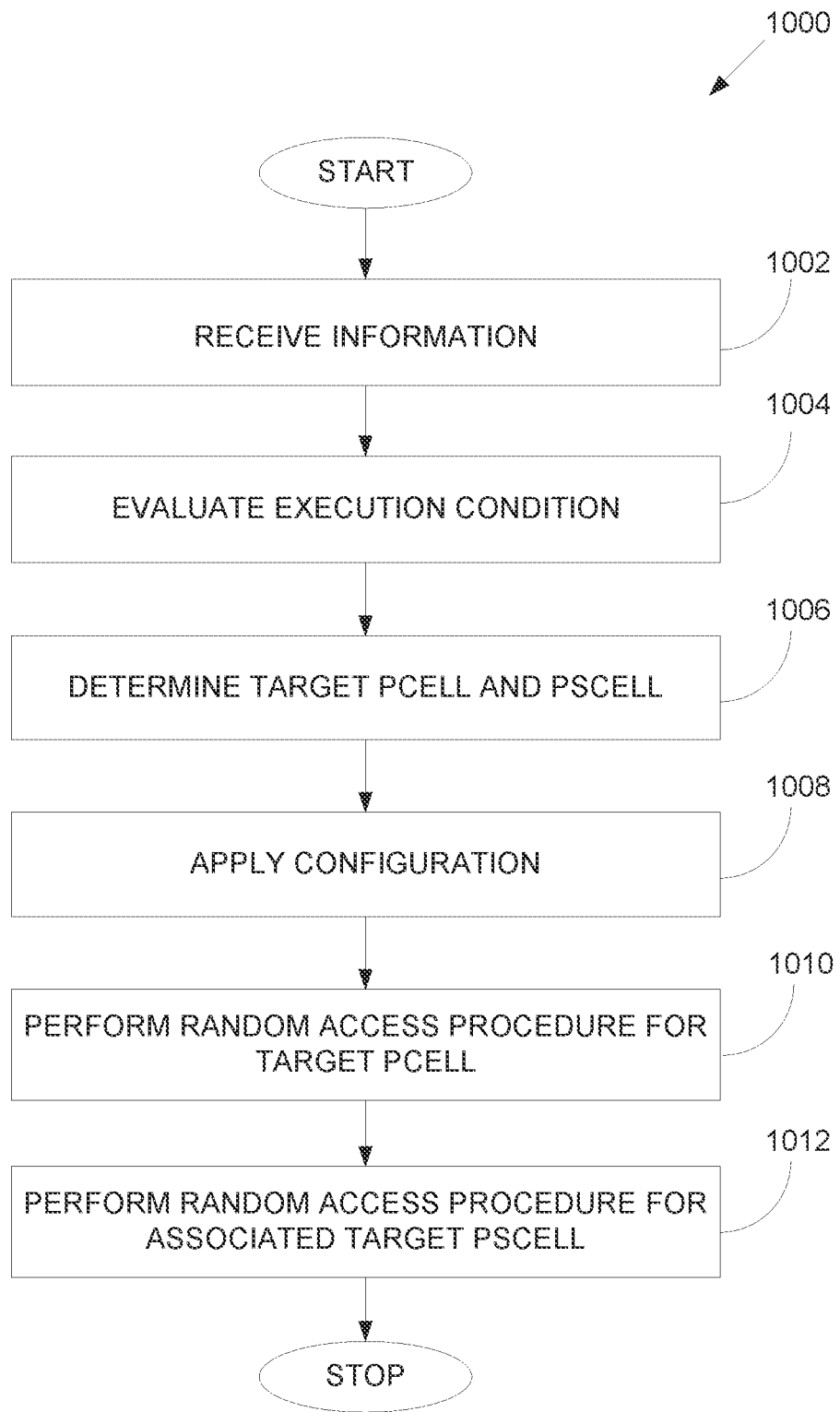
FIG. 10 illustrates a flowchart of method for a joint operation of conditional handover and conditional PSCell addition or change according to embodiments of the present disclosure.

FIG. 10 illustrates a flowchart of method 1000 for a joint operation of conditional handover and conditional PSCell addition or change according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1002. In step 1002, a UE receives information including association information, execution conditions, and configurations for candidate PCells and candidate PSCells.

In step 1002, the association information for the candidate PCells and the candidate PSCells includes a field indicating a mapping relationship between cell identifiers (IDs) or configuration IDs of the candidate PCells and cell IDs or configuration IDs of the candidate PSCells.

In step 1004, the UE evaluates the execution conditions for the candidate PCells and associated candidate PSCells simultaneously.

In step 1006, the UE, upon the execution conditions for (i) a candidate PCell among the candidate PCells and (ii) a candidate PSCell associated with the candidate PCell are satisfied, determines that the candidate PCell and the associated candidate PSCell as a target PCell and an associated target PSCell, respectively.

In step 1008, the UE applies the configurations for the target PCell and the associated target PSCell.

In step 1010, the UE performs a random access procedure for the target PCell.

In step 1012, the UE performs a random access procedure for the associated target PSCell.

In one embodiment, the UE determines an association between the candidate PCell and the candidate PSCell by identifying a field that includes a configuration among the configurations and an execution condition among the execution conditions for both of the candidate PCell and the candidate PSCell.

In one embodiment, the UE receives a RRC message including the association information, the RRC message including an encapsulated message and determines, based on the RRC message, an association between a candidate PCell and a candidate PSCell. In such embodiment, the RRC message includes a configuration and an execution condition for the candidate PCell, and wherein the encapsulated message includes a configuration and an execution condition for the candidate PSCell.

In one embodiment, the UE, upon the execution conditions for the candidate PCell is satisfied while simultaneously evaluating the execution conditions for the candidate PCell and at least one associated candidate PSCell, applies the configurations for the target PCell and perform the random access procedure for the target PCell, upon the random access procedure for the target PCell is successfully completed, evaluates the execution conditions for the candidate PSCells associated with the target PCell, and, upon the execution conditions for the associated candidate PSCell is satisfied, applies the configurations for the target PSCell and perform the random access procedure for the associated target PSCell.

In one embodiment, the UE evaluates the execution conditions for the candidate PCells, upon the execution conditions for the candidate PCell among the candidate PCells is satisfied, determines that the candidate PCell is the target PCell, applies the configurations for the target PCell and perform random access procedure for the target PCell, upon the random access procedure for the target PCell is successfully completed, evaluating the execution conditions for the candidate PSCells associated with the target PCell, and, upon the execution conditions for the associated candidate PSCell is satisfied, applies the configurations for the target PSCell and performing the random access procedure for the associated target PSCell.

In one embodiment, the UE receives an RRC message including an indication of a parallel operation mode or a serial operation mode and determines, based on the indication, whether to evaluate the execution conditions for the candidate PCell and the associated candidate PSCell in the parallel operation mode or the serial operation mode.

In one embodiment, the UE, upon the execution conditions for a candidate PCell is satisfied while simultaneously evaluating the execution conditions for the candidate PCell and at least one associated candidate PSCell, starts a timer for a configured duration, upon the execution conditions for the at least one associated candidate PSCell is satisfied while the timer runs, stopping the timer, applies the configurations, and perform the random access procedure for the target PCell and the associated target PSCell, and when the timer expires, applies the configurations and performing the random access procedure for the target PCell.

In one embodiment, the UE transmits, to the target PCell, a completion message after a completion of the random access procedure for at least one of the target PCell and the associated target PSCell.

In one embodiment, the UE stores the association information, the execution conditions, and the configurations for the candidate PCell and the candidate PSCell, and, upon the random access procedure to the target PCell and the associated target PSCell is successfully completed, release the association information, the execution conditions, and the configurations for the candidate PCells and the candidate PSCells.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    a transceiver configured to receive a radio resource control (RRC) reconfiguration message including at least one conditional reconfiguration, wherein each of the at least one conditional reconfiguration includes an execution condition for a candidate primary cell (PCell), a conditional RRC reconfiguration for the candidate PCell, an execution condition for a candidate primary-secondary cell (PSCell) associated with the PCell, and a conditional RRC reconfiguration for the candidate PSCell associated with the PCell; and
    a processor operably coupled to the transceiver, the processor configured to:
        evaluate execution conditions for the candidate PCells and associated candidate PSCells simultaneously,
        upon the execution conditions for (i) a candidate PCell among the candidate PCells and (ii) a candidate PSCell associated with the candidate PCell are satisfied, determine that the candidate PCell and the associated candidate PSCell as a target PCell and an associated target PSCell, respectively,
        apply the respective conditional RRC reconfigurations for the target PCell and the associated target PSCell,
        perform a random access procedure for the target PCell, and
        perform a random access procedure for the associated target PSCell.

2. The UE of claim 1, wherein association information for the candidate PCells and the candidate PSCells includes a field indicating a mapping relationship between cell identifiers (IDs) or configuration IDs of the candidate PCells and cell IDs or configuration IDs of the candidate PSCells.

3. The UE of claim 1, wherein the processor is further configured to determine an association between the candidate PCell and the candidate PSCell by identifying a field that includes a configuration among configurations and an execution condition among the execution conditions for both of the candidate PCell and the candidate PSCell.

4. The UE of claim 1, wherein:
    the transceiver is further configured to receive an RRC message including association information, the RRC message including an encapsulated message;
    the processor is further configured to determine, based on the RRC message, an association between a candidate PCell and a candidate PSCell;
    the RRC message includes a configuration and an execution condition for the candidate PCell; and
    the encapsulated message includes a configuration and an execution condition for the candidate PSCell.

5. The UE of claim 1, wherein the processor is further configured to:
    upon the execution conditions for the candidate PCell is satisfied while simultaneously evaluating the execution conditions for the candidate PCell and at least one associated candidate PSCell, apply configurations for the target PCell and perform the random access procedure for the target PCell; and
    upon the random access procedure for the target PCell is successfully completed, evaluate the execution conditions for the candidate PSCells associated with the target PCell; and
    upon the execution conditions for the associated candidate PSCell is satisfied, apply the configurations for the target PSCell and perform the random access procedure for the associated target PSCell.

6. The UE of claim 1, wherein the processor is further configured to:
    evaluate the execution conditions for the candidate PCells;
    upon the execution conditions for the candidate PCell among the candidate PCells is satisfied, determine that the candidate PCell is the target PCell;
    apply configurations for the target PCell and perform the random access procedure for the target PCell;
    upon the random access procedure for the target PCell is successfully completed, evaluate the execution conditions for the candidate PSCells associated with the target PCell; and
    upon the execution conditions for the associated candidate PSCell is satisfied, apply the configurations for the target PSCell and perform the random access procedure for the associated target PSCell.

7. The UE of claim 1, wherein:
    the transceiver is further configured to receive an RRC message including an indication of a parallel operation mode or a serial operation mode; and
    the processor is further configured to determine, based on the indication, whether to evaluate the execution conditions for the candidate PCell and the associated candidate PSCell in the parallel operation mode or the serial operation mode.

8. The UE of claim 1, wherein the processor is further configured to:
    upon the execution conditions for a candidate PCell is satisfied while simultaneously evaluating the execution conditions for the candidate PCell and at least one associated candidate PSCell, start a timer for a configured duration;
    upon the execution conditions for the at least one associated candidate PSCell is satisfied while the timer runs, stop the timer, apply configurations, and perform the random access procedure for the target PCell and the associated target PSCell; and
    when the timer expires, apply the configurations and perform the random access procedure for the target PCell.

9. The UE of claim 1, wherein the transceiver is further configured to transmit, to the target PCell, a completion message after a completion of the random access procedure for at least one of the target PCell and the associated target PSCell.

10. The UE of claim 1, wherein the processor is further configured to:
    store association information, the execution conditions, and configurations for the candidate PCell and the candidate PSCell; and
    upon the random access procedure to the target PCell and the associated target PSCell is successfully completed, release the association information, the execution conditions, and the configurations for the candidate PCells and the candidate PSCells.

11. A method of user equipment (UE) in a wireless communication system, the method comprising:
receiving a radio resource control (RRC) reconfiguration message including at least one conditional reconfiguration, wherein each of the at least one conditional reconfiguration includes an execution condition for a candidate primary cell (PCell), a conditional RRC reconfiguration for the candidate PCell, an execution condition for a candidate primary-secondary cell (PSCell) associated with the PCell, and a conditional RRC reconfiguration for the candidate PSCell associated with the PCell;
evaluating execution conditions for the candidate PCells and associated candidate PSCells simultaneously;
upon the execution conditions for (i) a candidate PCell among the candidate PCells and (ii) a candidate PSCell associated with the candidate PCell are satisfied, determining that the candidate PCell and the associated candidate PSCell as a target PCell and an associated target PSCell, respectively;
applying the respective reconfigurations for the target PCell and the associated target PSCell;
performing a random access procedure for the target PCell; and
performing a random access procedure for the associated target PSCell.

12. The method of claim 11, wherein association information for the candidate PCells and the candidate PSCells includes a field indicating a mapping relationship between cell identifiers (IDs) or configuration IDs of the candidate PCells and cell IDs or configuration IDs of the candidate PSCells.

13. The method of claim 11, further comprising determining an association between the candidate PCell and the candidate PSCell by identifying a field that includes a configuration among configurations and an execution condition among the execution conditions for both of the candidate PCell and the candidate PSCell.

14. The method of claim 11, further comprising:
receiving an RRC message including association information, the RRC message including an encapsulated message; and
determining, based on the RRC message, an association between a candidate PCell and a candidate PSCell, wherein the RRC message includes a configuration and an execution condition for the candidate PCell, and wherein the encapsulated message includes a configuration and an execution condition for the candidate PSCell.

15. The method of claim 11, further comprising:
upon the execution conditions for the candidate PCell is satisfied while simultaneously evaluating the execution conditions for the candidate PCell and at least one associated candidate PSCell, applying configurations for the target PCell and perform the random access procedure for the target PCell; and upon the random access procedure for the target PCell is successfully completed, evaluating the execution conditions for the candidate PSCells associated with the target PCell; and
upon the execution conditions for the associated candidate PSCell is satisfied, applying the configurations for the target PSCell and perform the random access procedure for the associated target PSCell.

16. The method of claim 11, further comprising:
evaluating the execution conditions for the candidate PCells;
upon the execution conditions for the candidate PCell among the candidate PCells is satisfied, determining that the candidate PCell is the target PCell;
applying configurations for the target PCell and perform the random access procedure for the target PCell;
upon the random access procedure for the target PCell is successfully completed, evaluating the execution conditions for the candidate PSCells associated with the target PCell; and
upon the execution conditions for the associated candidate PSCell is satisfied, applying the configurations for the target PSCell and performing the random access procedure for the associated target PSCell.

17. The method of claim 11, further comprising:
receiving an RRC message including an indication of a parallel operation mode or a serial operation mode; and
determining, based on the indication, whether to evaluate the execution conditions for the candidate PCell and the associated candidate PSCell in the parallel operation mode or the serial operation mode.

18. The method of claim 11, further comprising:
upon the execution conditions for a candidate PCell is satisfied while simultaneously evaluating the execution conditions for the candidate PCell and at least one associated candidate PSCell, starting a timer for a configured duration;
upon the execution conditions for the at least one associated candidate PSCell is satisfied while the timer runs, stopping the timer, applying configurations, and performing the random access procedure for the target PCell and the associated target PSCell; and
when the timer expires, applying the configurations and performing the random access procedure for the target PCell.

19. The method of claim 11, further comprising transmitting, to the target PCell, a completion message after a completion of the random access procedure for at least one of the target PCell and the associated target PSCell.

20. The method of claim 11, further comprising:
storing association information, the execution conditions, and configurations for the candidate PCell and the candidate PSCell; and
upon the random access procedure to the target PCell and the associated target PSCell is successfully completed, releasing the association information, the execution conditions, and the configurations for the candidate PCells and the candidate PSCells.

* * * * *